United States Patent [19]
Vom Dahl et al.

[11] Patent Number: 5,490,540
[45] Date of Patent: Feb. 13, 1996

[54] UNIT FOR A SINGLE-LEVER MIXING VALVE

[75] Inventors: Uwe Vom Dahl; Peter Lange; Helmut Ziebach, all of Luedenscheid, Germany

[73] Assignee: Fluehs Drehtechnik GmbH, Luedenscheid, Germany

[21] Appl. No.: 256,586

[22] PCT Filed: Sep. 15, 1993

[86] PCT No.: PCT/DE93/00864

§ 371 Date: Jul. 18, 1994

§ 102(e) Date: Jul. 18, 1994

[87] PCT Pub. No.: WO94/11660

PCT Pub. Date: May 26, 1994

[30] Foreign Application Priority Data

Nov. 17, 1992 [DE] Germany ............ 42 38 671.3

[51] Int. Cl.[6] .................................................. F16K 11/18
[52] U.S. Cl. .................. 137/625.17; 137/625.4; 137/636.3; 251/127; 251/285; 251/288
[58] Field of Search ............... 137/625.17, 625.4, 137/636.3, 636.2, 636; 251/127, 285, 288

[56] References Cited

U.S. PATENT DOCUMENTS

| 2,050,273 | 8/1936 | Chamberlin | 137/636.3 |
|---|---|---|---|
| 2,238,916 | 4/1941 | Powers | 137/636.3 |
| 2,949,923 | 8/1960 | Clerc | 137/636.3 X |
| 3,130,750 | 4/1964 | Post | 137/636.3 |
| 3,506,036 | 7/1970 | Hare | 137/636.3 |
| 3,623,510 | 11/1971 | Hare | 137/636.3 |
| 3,678,961 | 7/1972 | Grosche | 137/636.2 |
| 3,823,742 | 7/1974 | Van Corpon | 137/636.3 |
| 3,987,819 | 10/1976 | Scheuermann | 137/636.2 X |

FOREIGN PATENT DOCUMENTS

| 0238674 | 9/1987 | European Pat. Off. . |
|---|---|---|
| 7929343 | 5/1981 | France . |
| 2827236 | 1/1979 | Germany . |
| 2929199 | 4/1980 | Germany . |

*Primary Examiner*—John Rivell
*Attorney, Agent, or Firm*—Spencer & Frank

[57] ABSTRACT

A unit for a single-lever mixing valve, includes a fixed housing defining an upper region, and a bottom, inlet region. An inner sleeve is located within the fixed housing. A cage is located within the fixed housing and adjacent to the inner sleeve. The cage is rotatable and radially displaceable relative to the housing. A spindle is swively mounted obliquely inside the inner sleeve, and engages the cage. The spindle is actuated externally relative to the fixed housing. A plurality of flat, superposed washers are provided. Each washer has at least one opening therethrough. One of the washers is an inlet valve attached to the fixed housing. Another of the washers is a distributor, temperature valve attached to the cage. Another of the washers is a volume valve forming a shim fitted between the inlet valve and the temperature valve. The volume valve and the cage are together radially displaceable on the inlet valve relative to the fixed housing. The temperature valve and the volume valve are together radially displaceable relative to the inlet valve. The temperature valve and the cage are rotatable together relative to the volume valve.

23 Claims, 11 Drawing Sheets

UNIT FOR A SINGLE-LEVER MIXING VALVE

BACKGROUND OF THE INVENTION

The present invention relates to a unit for a single-lever mixing valve having a fixed housing, an inner sleeve disposed within the housing, a cage which is rotatable and radially displaceable relative to the housing, a spindle which is swivel-mounted obliquely inside the inner sleeve, engages in the cage and is actuated externally, and with superposed washers having openings, of which one is desired as an inlet valve and attached to the housing and another is designed as a distributor valve and attached to the cage, while yet another is fitted as a shim between the inlet valve and the distributor valve.

Units for single-lever mixing valves of the abovementioned type are known from DE 28 27 236 A1, DE 29 29 199 A1. With these known units the shim can rotate together with the inner sleeve relative to the inlet valve. The distributor valve can rotate radially relative to the shim. Mixing of clod and warm water into mixed water occurs between inlet and distributor valves, while opening and closing of the valve occurs between shim and distributor valve. In the known units there is the risk of so-called spillage: if only a small amount of mixed water is removed, the openings—not exhibiting separate inlet ducts inside the same washer—between shim and distributor valve are extensively closed and if the temperature of the mixed water is selected such that the openings between inlet valve and shim are extensively opened, there may be resulting mixed water reflux in the lower-pressure water feed pipe. Spillage can be overcome by incorporation of reflux valves in the feed pipes. This is, however, not a justifiable expense.

SUMMARY OF THE INVENTION

This is where the present invention is of assistance. The object of the present invention is to provide a unit for a single-lever mixing valve of the type initially described such that there is no spillage. This task is solved according to the present invention by the shim being used as a volume valve which can be radially displaced on the inlet valve relative to the cage, and by the distributor valve being used as a temperature valve which is rotatable with the cage relative to the volume valve and which together with the volume valve is rotatable and radially displaceable relative to the inlet valve.

In the present invention the inner sleeve is disposed permanently in the housing. Relative thereto the spindle is turned and swivelled and the cage is moved rotationally and translationally. The separate inlet ducts of the washers prevent spillage without reflux valves being present in the feed pipes. The maximum angle of rotation between distributor valve/shim and inlet valve is adjustable, thus enabling the choice of a temperature limit. This also makes for a slimmer construction offering the same volume flow. Better design possibilities present themselves for a housing accommodating the unit. There is also a saving on materials.

An embodiment of the invention is illustrated in the diagram and is described hereinafter in detail. In twice-enlarged representation.

BRIEF DESCRIPTION OF THE DRAWINGS

DETAILED DESCRIPTION OF THE INVENTION

Figure 1:
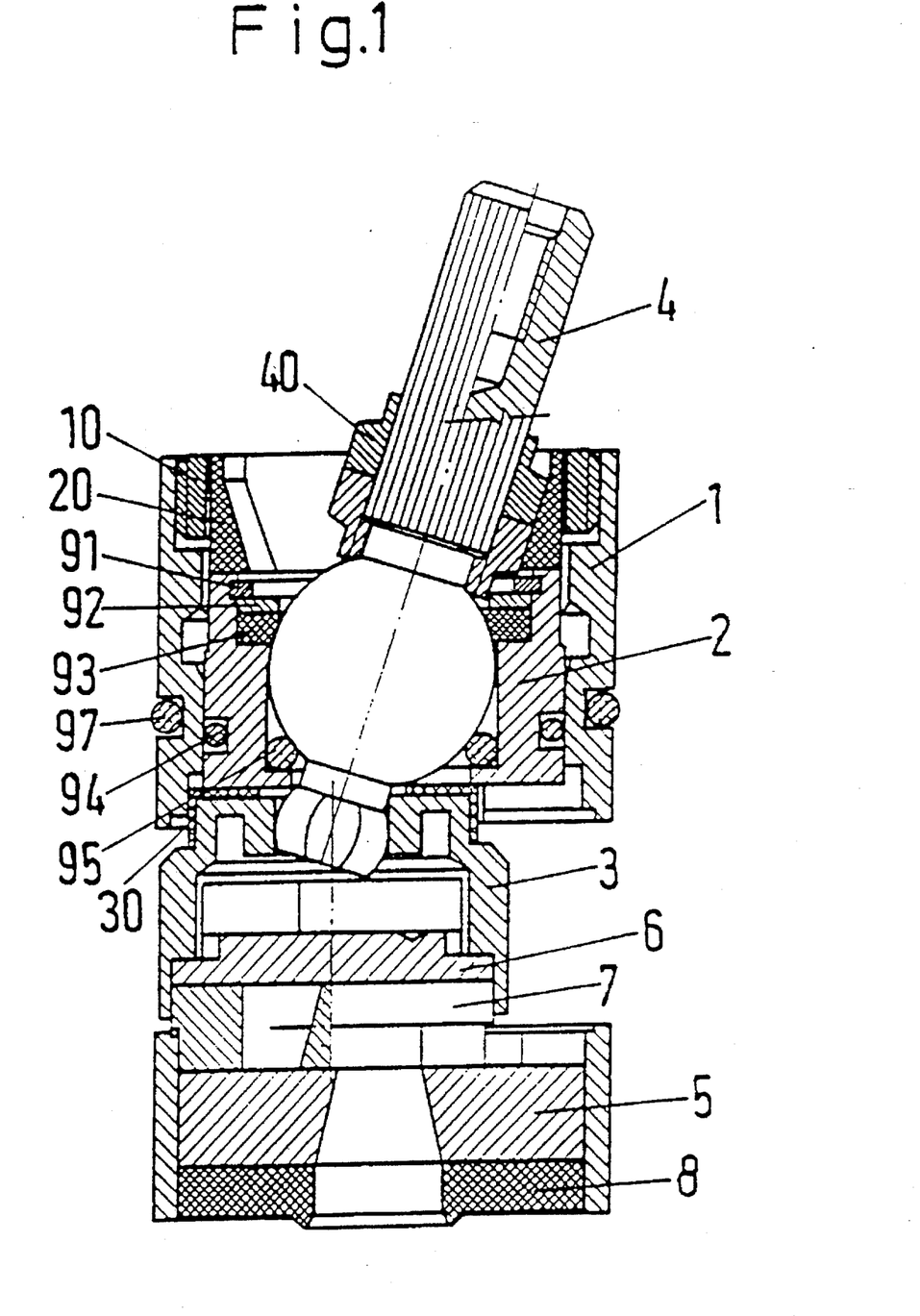
FIG. 1 shows an axial section through a unit for a single-lever mixing valve in the assembled state.
Figure 2:
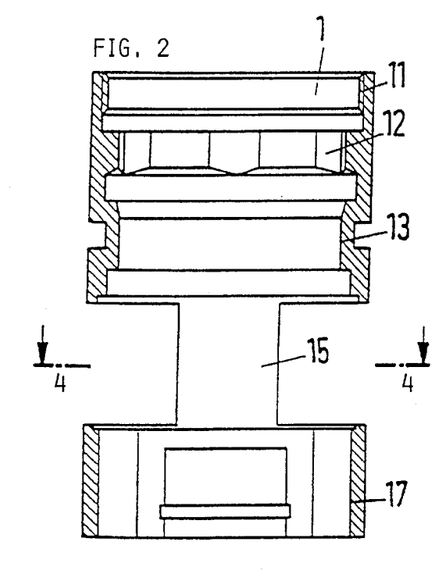
FIGS. 2 and 3 show two axial sections of the housing rotated towards each other at 90°.
Figure 3:
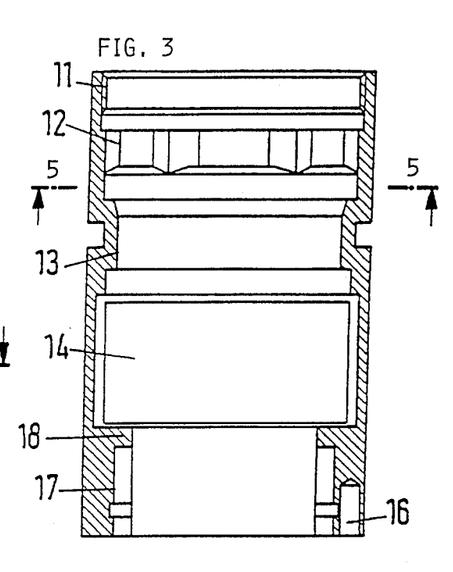
Figure 4:
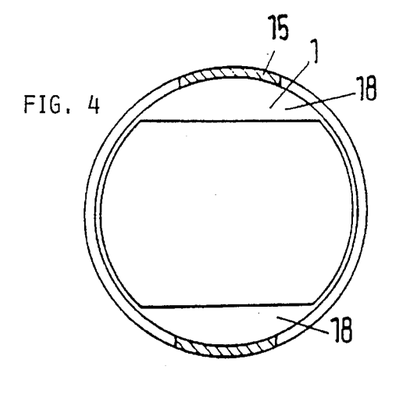
FIG. 4 is a cross-section taken along section line 4—4 from FIG. 2.
Figure 5:
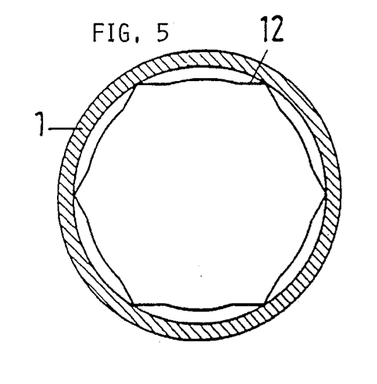
FIG. 5 is a cross-section taken along section line 5—5 from FIG. 3.
Figure 6:
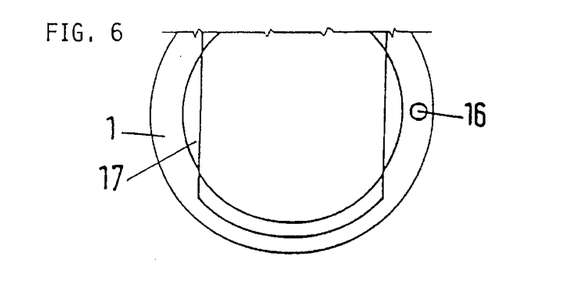
FIG. 6 is a bottom view of the housing.
Figure 7:
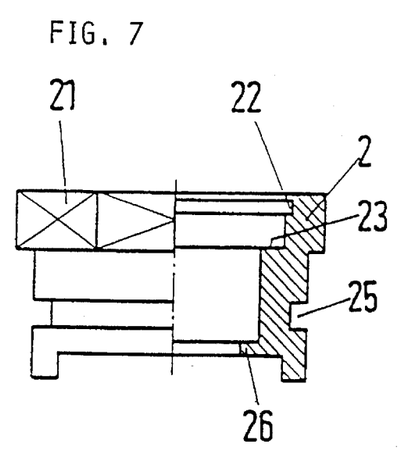
FIGS. 7–9 are a front elevation, the left side elevation, each half in axial section, and a plan view of an inner sleeve of the unit, respectively.
Figure 8:
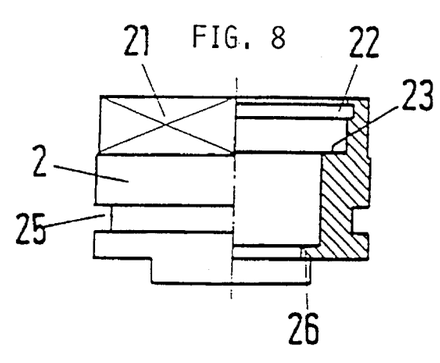
Figure 9:
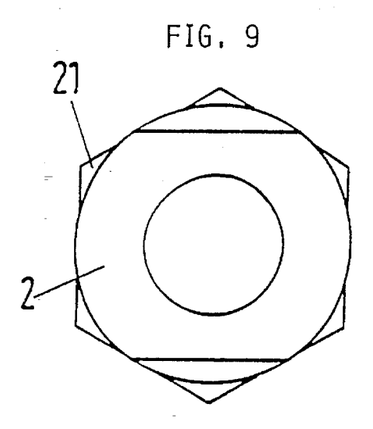
Figure 10:
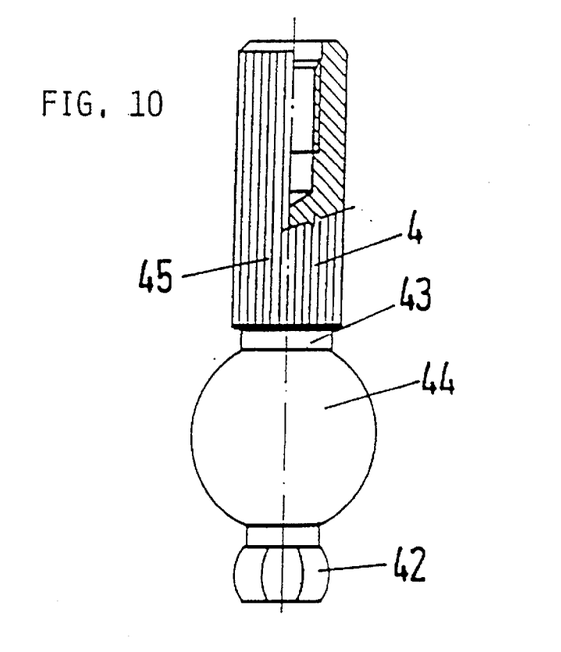
FIGS. 10–12 show a spindle for the unit in front elevation, bottom view and plan view, respectively.
Figure 11:
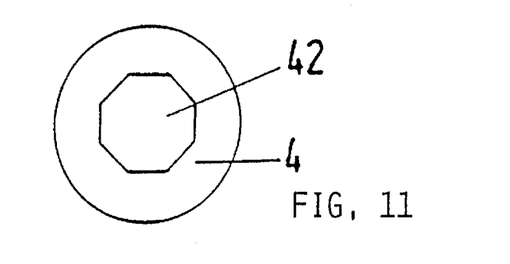

Referring to FIG. 1, for a single-lever mixing valve selected as exemplary embodiment exhibits a fixed housing 1, in which is attached an inner sleeve 2. Rotatable and radially displaceable relative to inner sleeve 2 is a cage 3 disposed in housing 1 beneath inner sleeve 2. Rotatably and swivel-mounted in inner sleeve 2 is a spindle 4 which engages inwards in cage 3 and is actuated externally. To control the quantity and temperature of the mixed water mingled and delivered from the supplied hot and cold water the unit contains washers which are superposed, and that present openings. One of the washers is designed as inlet valve 5 and is attached to housing 1. Another washer is designed as temperature valve 6 and is attached to cage 3. Fitted between inlet valve 5 and temperature valve 6 is a volume valve 7 which together with cage 3 is radially and translationally displaceable relative to inlet valve 5. Temperature valve 6 is rotatable relative to volume valve 7, therefore and is rotationally displaceable, and together with volume valve 7 is therefore radially and translationally displaceable relative to inlet valve 5. The inlet side of the unit forms an elastic packing washer 8 held by housing 1.

The spindle-side end of the unit forms an eyebolt 10 which is screwed into housing 1. A synthetic component 20 is held by eyebolt 10, which adjoins the spindle-side front end of inner sleeve 2. On its side facing synthetic component 20, inner sleeve 2 exhibits an internal groove accommodating a retaining ring 91 which holds a locking ring 92 and a synthetic slide ring 93 lying on one another in the axial direction of inner sleeve 2 and on a shoulder of the inner sleeve. Inner sleeve 2 is sealed opposite housing 1 and spindle 4 by O-rings 94, 95. Housing 1 and the entire unit are sealed by means of another O-ring 97 opposite a valve, not illustrated. Attached to the free end of spindle 4 is a temperature valve 40 which in cooperation with synthetic component 20 delimits the angle of rotation of spindle 4 and thus the aperture diameter of the warm water opening in temperature valve 6. Attached to cage 3 on the side adjoining inner sleeve 2 and lying thereon is a sliding cap 30.

Inlet valve 5—cf. FIGS. 1 and 24–27—is formed in its contour essentially from graduated circles, namely two diametrically opposed graduated circles 51 of larger diameter and two graduated circles 52 of smaller diameter arranged between the graduated circles of larger diameter 51. Graduated circles 51, 52 are interconnected by straight lines 53. Inlet valve 5 exhibits two openings 54 disposed symmetrically to its longitudinal central axis. One of the two openings is connected with the cold water feed pipe, the other with the warm water feed pipe. Openings 54 are designed circularly on the underside of the inlet valve, and on the upper side are designed rectangularly with rounded corners. Openings 54 are disposed offset to the longitudinal central axis on the upper side compared to the underside; the result are oblique openings 54 which run trapezoid in one cross-sectional plane, according to section 26—26 in FIG. 24, and in the other plane run in parallelogram manner, according to section 27—27. With its edge, inlet valve 5 fits into place in housing 1 in the manner of a bearing. Openings 54 are separated from one another by cross-member 55 disposed between them.

Figure 12:
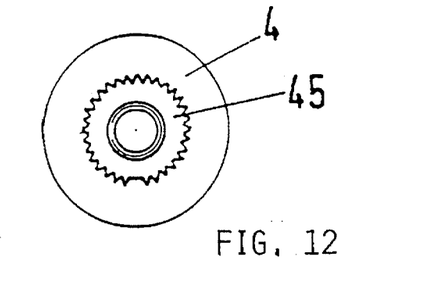

The shim provided as volume valve 7 is essentially circular in shape, as in FIGS. 1 and 12. Upper side 75 of volume valve 7 is designed as a circular area, while underside 76 is a circular area of larger diameter, which is truncated on the opposite sides like a secant 77. The result thereof is two recesses disposed parallel to underside 76 and to one another, with which volume valve 7 can glide along identically formed surfaces in housing 1. At the transition from the circular surface to secants 77, underside 76 overhangs upper side 75, the result of which is four protruding keys 78. Symmetrically to the longitudinal central axis, volume valve 7 exhibits two openings 71 separated from one another by a cross-member. In the bottom view, each opening 71 has the shape of a rectangle with rounded corners, and in the top view has the shape of a trapezoid whose base runs vertically to the longitudinal central axis. Cogs 72 are formed in the region of the longer base. Cogs 72 prevent water hammer and noises and enable the removal of minimal quantities. Provided on the side of cogs 72 is opening 71 with a sloping wall 73 opening to temperature valve 72, and further with a wall 74 vertical to the washer front surfaces. The circumference of volume valve 7 is shaped such that laterally reversed installation is not possible.

Figure 28:
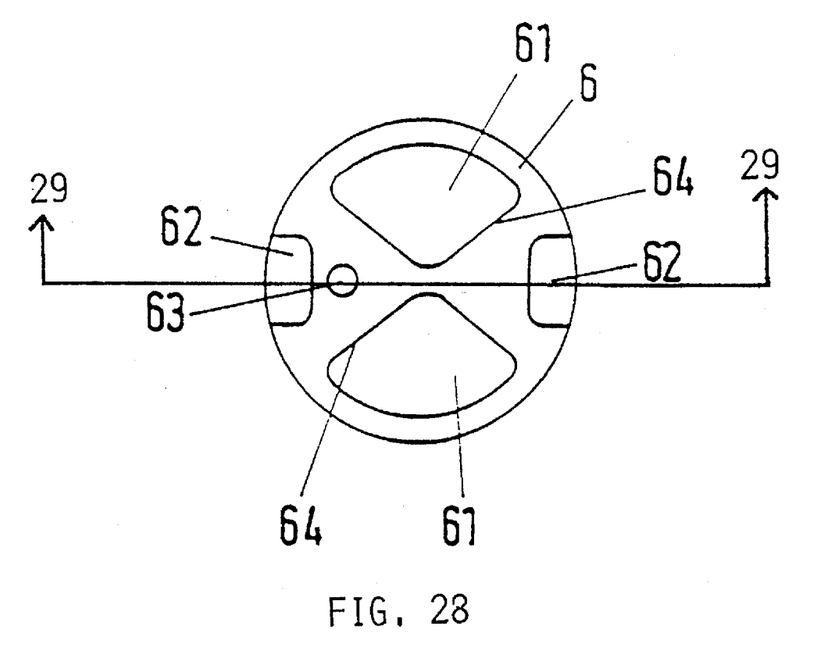
FIGS. 28–29 show a temperature valve for the unit in plan view and axial section along line 29—29, respectively.
Figure 29:
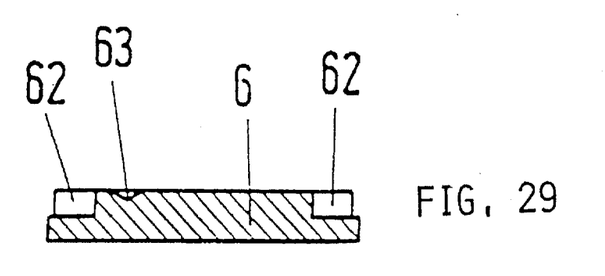
Figure 30:
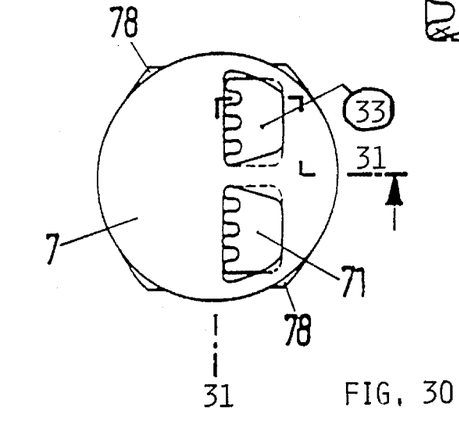
FIGS. 30–33 show a volume valve for the unit in plan view, bottom view and in section.
Figure 31:
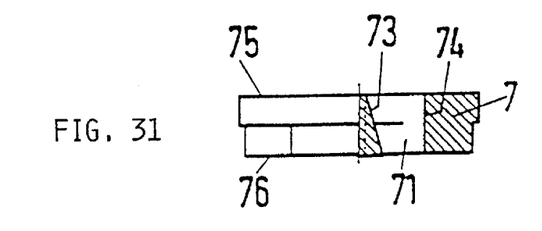
Figure 32:
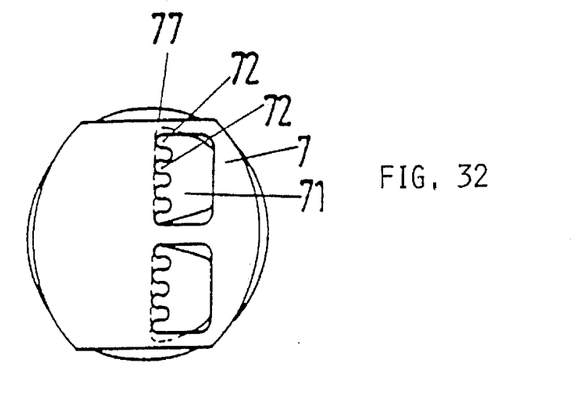
Figure 33:
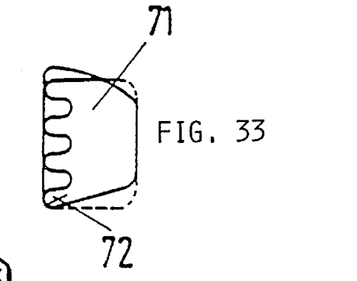

Temperature valve 6 is circular in design, as in FIGS. 1 and 28–29. It has two symmetrically disposed sector-shaped openings 61. One of the two openings is connected with the cold water feed pipe, the other with the warm water feed pipe. On its edge, temperature valve 6 exhibits flush-type steps 62, between sector-shaped openings 61 on the upper side. By these steps 62 temperature valve 6 lies on shoulders 31 in cage 3. Steps 62 are separated from one another by and from openings 61. Walls 64 of sector-shaped openings 61 run vertically to the bases. For the bearing unit of temperature valve 6 into housing 1, steps 62 may be arranged offset compared to the precisely diametrical arrangement according to the same side. Provided in the connection line of steps 62 in the region of one step is a grain-like recess 63 for the bearing unit.

Figure 34:
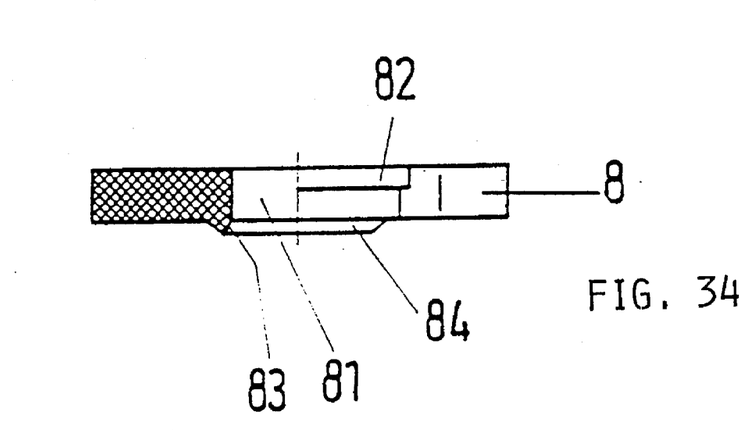
FIGS. 34–35 show a moulded seal for the unit in side elevation, in partial axial section and in bottom view, respectively.
Figure 35:
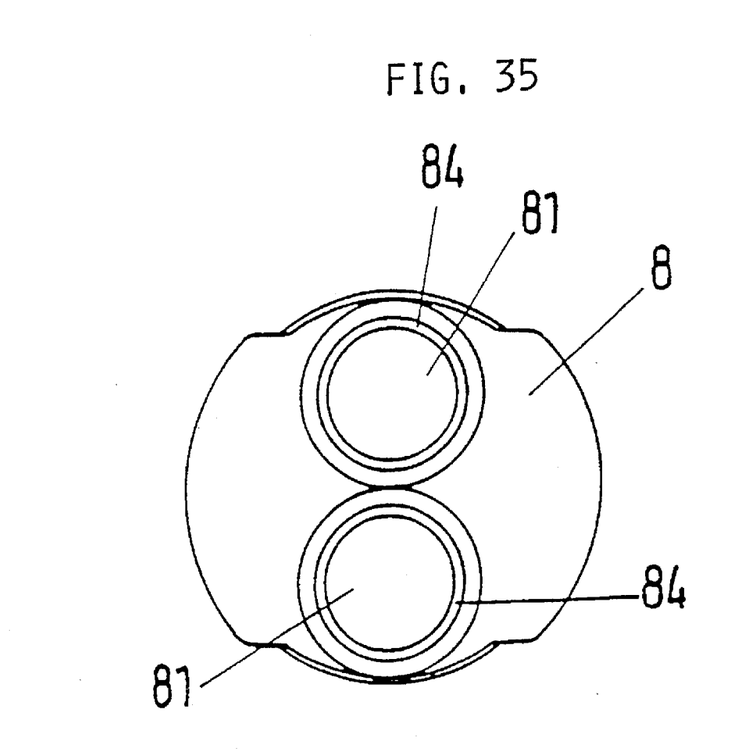

Packing washer 8 forming the inlet side of the unit lies on inlet valve 5 and is held by housing 1, as in FIGS. 1, 34, and 35. Packing washer 8 displays the same contour as inlet valve 5 and is equipped with two symmetrically disposed circular openings 81 of packing washer 8 which are congruent with circular openings 54 of inlet valve 5 on the adjoining side. Packing washer 8 is flat on this side. On the side averted from inlet valve 5 packing washer 8 is provided on the edge of openings 81 with keys 84. On one hand, packing washer 8 together with circular keys 84 cuts off the cold and warm water supply. On the other hand, on the side facing inlet valve 5 two recessed steps 82 joining the smaller diameter circle prevent disintegration of the components of the unit not yet accommodated in the valve.

In FIGS. 1 and 2–6 outer housing 1 presents on the side of the spindle an inner thread 11 for taking up eyebolt 10. Adjoining this housing, 1 is equipped with an inner hexagon 12 for the fixed installation of inner sleeve 2 and synthetic component 20. Openings 14 adjoin a cylindrical bearing surface 13 for inner sleeve 2. Openings 14 are formed by the wall of outer housing 1 in this region which are formed only by diametrically opposing cross-members 15. Openings 14 enable lateral escape of the mixed water from the unit. Accommodated on the valve side in a bottom end of housing 1 is a borehole 16 running parallel to the central axis for taking up an axial bolt used to fix the housing in a valve. On the inside housing 1 is provided on this side, with a contour 17 identical to the outer contours of inlet valve 5 and packing washer 8 for their attaching. Adjoining this, an inner shoulder 18 is provided with a bearing surface that faces spindle 4, and an inwards facing guide surface for volume valve 7.

In FIGS. 1 and 7–9 inner sleeve 2 exhibits externally on the side facing spindle 4 a hexagon 21, which engages in inner hexagon 12 of housing 1, as shown in FIGS. 1–3. Inside, at the level of hexagon 21, a groove 22 is provided for taking up retaining ring 91, adjoining which is a shoulder 23, on which lie locking ring 92 and synthetic slide ring 93. Facing the opposite end, inner sleeve 2 exhibits externally a circular groove 25 for taking up O-ring 94. Provided inside on this bottom end is an inner flange 26 on which O-ring 95 rests.

Figure 13:
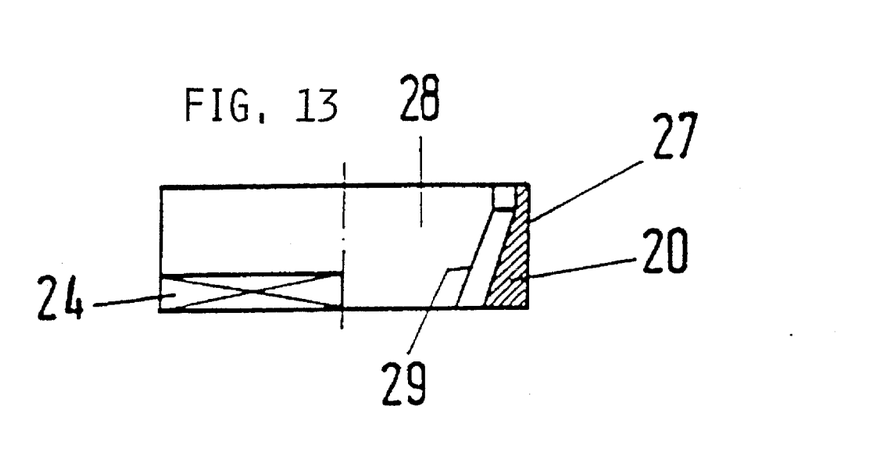
FIGS. 13–14 show a cast component set in to the housing on the spindle side, preferably of a synthetic material, in side elevation, in partial axial section and in plan view, respectively.
Figure 14:
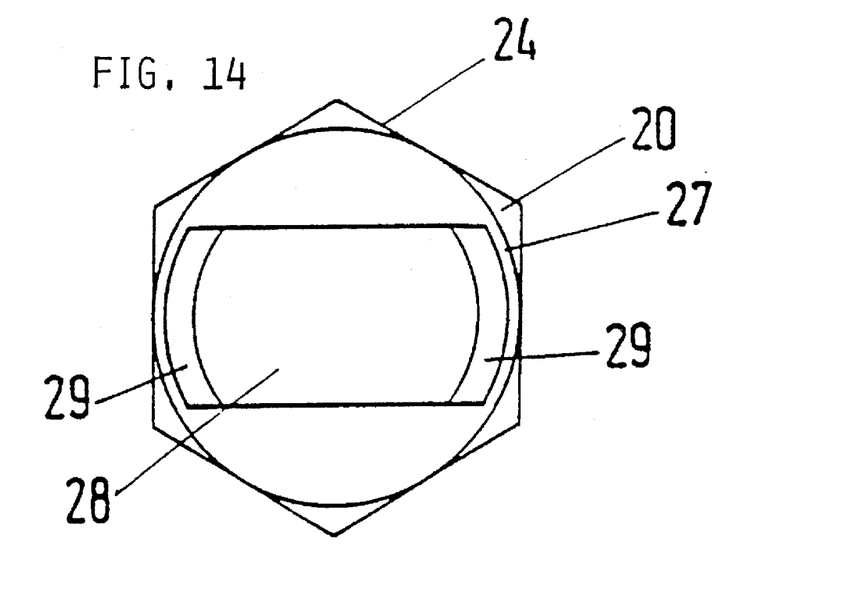
Figures 15, 16:
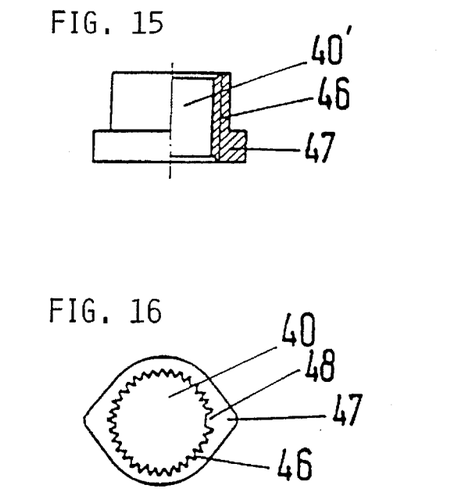
FIGS. 15–18 show the components of a temperature limiter pluggable on the spindle in side elevation, in partial axial section and in bottom view.
Figure 17:
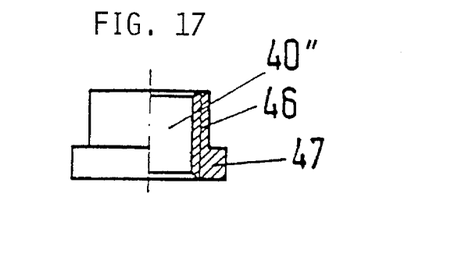
Figure 18:
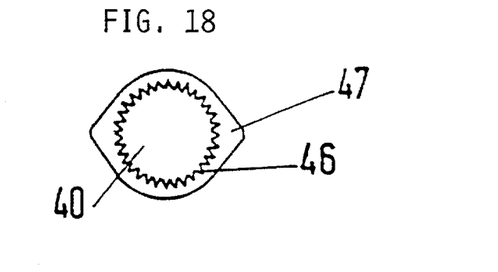
Figure 19:
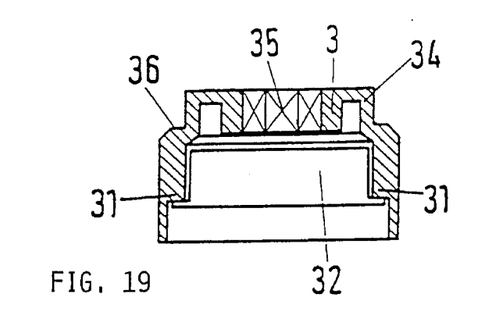
FIGS. 19–21 show a cage for the housing in axial section, in left side elevation, in partial axial section and in bottom view, respectively.
Figure 20:
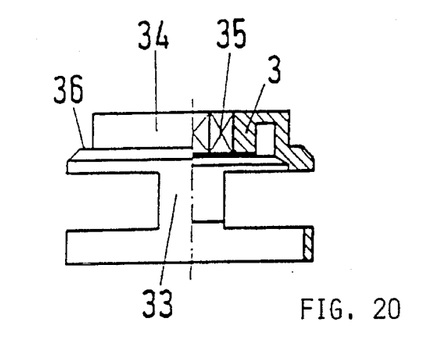
Figure 21:
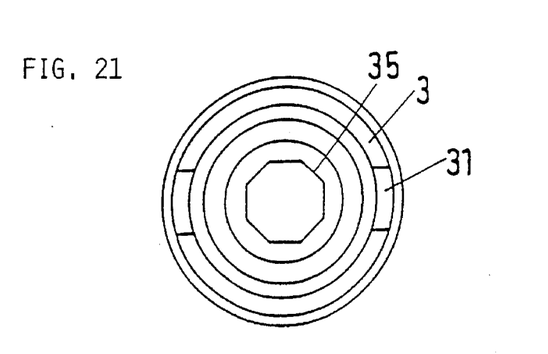

Lying on the top end of inner sleeve 2, facing spindle 4, is synthetic component 20, as shown in FIGS. 1 and 13–14. In the bearing region—that is, the region where inner sleeve 2 externally exhibits hexagon 21—synthetic component 20 also presents a hexagon 24, with which component 20 is held secure in housing 1 by means of inner hexagon 12. Hexagon 24 overhangs outer wall 27 of synthetic component 20 like a flange, such that the latter can be fixed in place by retaining ring 10. Inside synthetic component 20 is a longitudinal recess 28 for guiding spindle 4. Front ends 29 of recess 28 run conically inwards as they taper.

Cage 3 is designed like a sheath, as shown in FIGS. 1 and 10–21. Projecting from the valve-side end are bosses 31 for engaging in steps 62 of temperature valve 6. At a distance from this, side wall cage 3 also exhibits openings 32 for the escape of the mixed water. These openings 32 also are formed between diametrically opposed cross-members 33 running in an axial direction. The end opposite bosses 31 is sealed off by a cover 34. Provided in cover 34 is an opening 35 which is designed as an inner hexagon and which takes up the inner end of spindle 4. Cover 34 overhangs the remaining portion of cage 3 in the manner of a castle nut. The result is an external circular shoulder 36.

Figure 22:
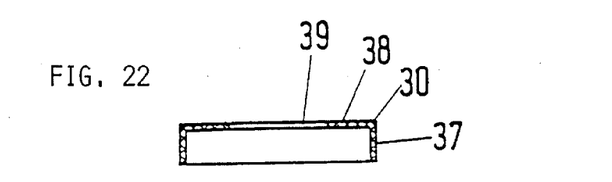
FIGS. 22–23 show a sliding cap covering the cage in axial section and in plan view, respectively.
Figure 23:
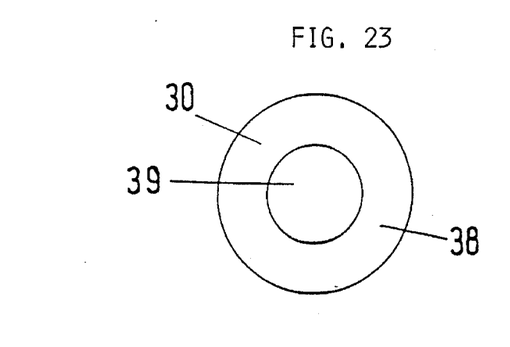
Figure 24:
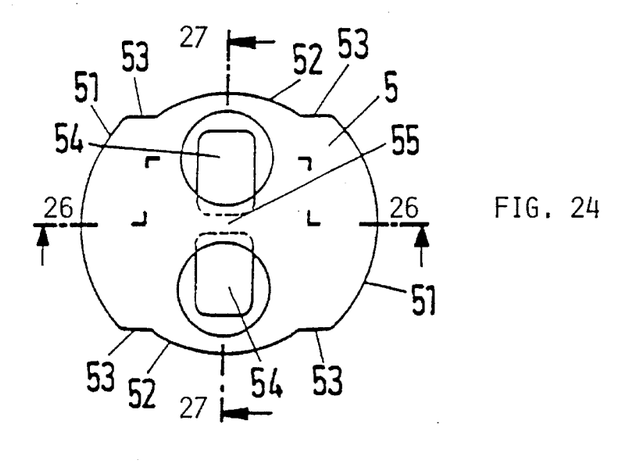
FIGS. 24–27 show an inlet valve for the unit in bottom view, plan view and in axial sections along section lines 26—26 and 27—27, respectively.
Figure 25:
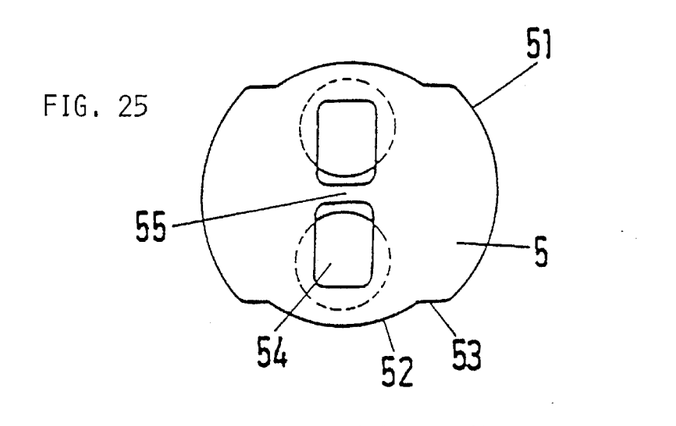
Figure 26:
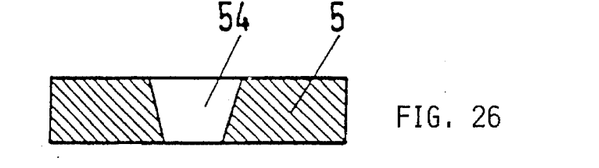
Figure 27:
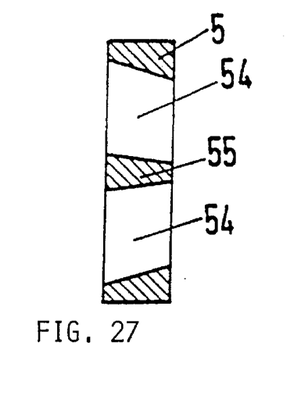

Cover 34 is overhung by sliding cap 30, as shown in FIGS. 1, 22, and 23 which has the shape of a cylinder 37, one end of which is open and the opposite end of which is provided with a floor 38 which presents an opening 39 for the passage of spindle 4. Along with floor 38 sliding cap 30 lies on cover 34 of cage 3.

Mounted in inner sleeve 2 is spindle 4, with the assistance of synthetic slide ring 93, as shown in FIGS. 1 and 10–12. In its part projecting into opening 35 of cage 3 provided with the inner hexagon, spindle 4 is designed as an octagonal plate 42. Octagonal joint comprising opening 35 and plate 42, effects the backlash-free rotatory movement of cage 3 during rotation of spindle 4 and thus the temperature adjustment. Octagon plate 42 is easy to manufacture on an autolathe. With swivelling of spindle 4, octagonal plate 42 presses cage 3 over opening 35 in a translational movement, which is restricted by oblique ends 29 provided on synthetic component 20, and on which temperature limiter 40 comes to stop on spindle 4 in its final position. A volume flow limit can be adjusted by notched cams in synthetic component 20. In the region between octagonal plate 42 and a cylindrical component 43, the spindle is designed as a ball 44, by means of which spindle 4 lies on the inner wall of inner sleeve 2 and synthetic slide ring 93. In this way, relaying of the swivelling movement of spindle 4 is guaranteed. The outer end of spindle 4 forms a polygon 45, onto which may be attached a lever of a mixing armature, not illustrated, and temperature limiter 40.

Temperature limiter 40 consists of two sleeves, as shown in FIGS. 1, 15–18. Each sleeve 40, 40" presents in a longitudinal direction an inner cogged wheel rim 46 corresponding to polygon 45 of spindle 4. At their opposite ends, the sleeves are provided on diametrically opposite sides with sharp, flange-like bosses extending outwards. With bosses 47, temperature limiter 40 impacts on the side walls of synthetic component 20 which leads spindle 4 during the translational movement when the latter is offset in rotational movement. If in polygon 45 a longitudinal groove is given the width of two cogs, and if cogged wheel rim 46 of temperature limiter 40 is given at any point a double width cog, the position of temperature limiter 40 on spindle 4, and thus the angle of rotation of the spindle, is fixed accurately. The double-width cog is provided effectively in the connecting line of both bosses. Temperature limiter 40 thus formed and located guarantees complete cold water supply and total shut-off of warm water. The use of two components for temperature limiter 40 makes it possible to select an angle between bosses 47 of both components in such a way that the rotational movement of spindle 4 is further restricted: Between one fixed end position, in which the total cold water flow is supplied, and the other end position, in which the total warm water flow would be flowing, an angle is selected which enables flow only to a partial warm water flow. The mixed water temperature can be restricted upwards. The nominated design with temperature limiter 40 is a good value solution for transverse bolt stops compared to radial milling Openings 54, 61 and 71 in inlet valve, temperature valve and volume valve 5, 6 and 7 cover and conceal each other depending on the position of cage 3 released by spindle 4 relative to housing 1. In the closed or resting position volume valve 7—as well as the temperature valve 6—connected to cage 3 closes off opening 54 in the inlet valve, so that no water can pass through the unit. Depending on the degree of the swivelling movement of spindle 4 in a vertical direction, a translational movement of cage 3 takes place relative to housing 1 and thus of volume valve 7 relative to inlet valve 5. Openings 54 and 71 are covered more or less; the desired quantity of mixed water can pass through the unit and escape by way of lateral openings 32 and 14. Depending on the swivelling movement of spindle 4 in a horizontal direction, a rotational movement of cage 3 takes place relative to housing 1 and thus of temperature valve 6 relative to inlet valve 5. Depending on the spindle position, opening 61 for warm water in temperature valve 6 covers associated opening 71 in volume valve 7 from complete covering to complete opening. Inversely, opening 61 for cold water covers associated opening 71 from complete covering to complete opening. Mixed water of the desired temperature is mixed and passes through the openings. The translational and rotational movements overlap each other.

We claim:

1. A unit for a single-lever mixing valve, comprising:

a fixed housing defining an upper region, and a bottom, inlet region;

an inner sleeve located within said fixed housing;

a cage located within said fixed housing and adjacent to said inner sleeve, said cage being rotatable and radially displaceable relative to said housing;

a spindle swively mounted obliquely inside said inner sleeve, and engaging said cage, said spindle being actuated externally relative to said fixed housing; and a plurality of flat, superposed washers each having at least one opening therethrough, one of said washers being an inlet valve attached to said fixed housing, another of said washers being a distributor, temperature valve attached to said cage, and another of said washers being a volume valve forming a shim fitted between said inlet valve and said temperature valve, said volume valve and said cage being together radially displaceable on said inlet valve relative to said fixed housing, said temperature valve and said volume valve being together radially displaceable relative to said inlet valve, and said temperature valve and said cage being rotatable together relative to said volume valve.

2. The unit as defined in claim 1, wherein said housing includes two oppositely located guide surfaces; and wherein said volume valve has an essentially circular shape, a first, upper portion of said volume valve being a circle, and a second, larger, oppositely located bottom portion of said volume valve being circular with two oppositely located truncated edges defining two parallel recesses, the recess engaging the respective guide surfaces so that said volume valve can glide along said guide surfaces.

3. The unit as defined in claim 2, wherein at a transition from the respective truncated edges to a curved edge of said second portion, said second portion overhangs the first portion to define four protruding keys.

4. The unit as defined in claim 2, wherein said volume valve has a longitudinal central axis, and two openings therethrough, the openings being arranged symmetrically to the axis, and being separated from one another by a cross-member, each said opening having a rectangular shape with rounded corners at said second portion, and a trapezoidal cross-section with a base extending parallel to the axis.

5. The unit as defined in claim 4, wherein each said opening includes a plurality of cogs defining a sloping wall, and a further wall corresponding to the base of the trapezoidal cross-section and being perpendicular to the first and second portions; said openings leading to said temperature valve.

6. The unit as defined in claim 1, wherein said temperature valve is circular-shaped, and includes two symmetrically arranged sector-shaped openings therethrough, one of the openings being connected with a cold water feed pipe, and the other of the openings being connected with a warm water feed pipe.

7. The unit as defined in claim 6, wherein said temperature valve defines an edge having steps therein, said steps being located generally between the sector-shaped openings and on an upper side of said temperature valve; and wherein said cage includes shoulders engaging with said steps.

8. The unit as defined in claim 7, wherein said steps are separated from one another and from the sector-shaped openings by a plurality of walls that extend perpendicular to a base surface of said temperature valve.

9. The unit as defined in claim 1, wherein said inlet valve has a profile formed by two diametrically opposed graduated circles having a first diameter, and two graduated circles having a second diameter smaller than the first diameter and arranged between the circles of a first diameter, the circles of a second diameter being interconnected with the circles of a first diameter by straight lines.

10. The unit as defined in claim 9, wherein said inlet valve has a longitudinal central axis, an upper side, an opposite lower side, and two openings therethrough, the openings being arranged symmetrically to the axis, one of the openings being connected to a cold water feed pipe, and the other of the openings being connected with a warm water feed pipe, the openings having a circular shape on the lower side, and a rectangular shape with rounded corners on the upper side, the rectangular shape being disposed offset to the axis relative to the respective circular shape, and the openings having a trapezoidal cross-section along a first plane parallel to the axis, and a parallelogram cross-section along a second plane parallel to the axis.

11. The unit as defined in claim 1, further comprising a packing washer forming an inlet side of said unit and being held by said fixed housing, said packing washer having a contour substantially identical to a contour of said inlet valve.

12. The unit as defined in claim 11, wherein said inlet valve has two openings therethrough, and said packing washer includes two symmetrically arranged circular openings each being congruent with a respective, adjoining opening of said inlet valve.

13. The unit as defined in claim 12, wherein said packing washer has a profile formed by two diametrically opposed graduated circles having a first diameter, and two graduated circles having a second diameter smaller than the first diameter and arranged between the circles of a first diameter, the circles of a second diameter being interconnected with the circles of a first diameter by straight lines, and wherein on a side of said packing washer facing away from said inlet valve, an edge of the openings of said packing washer are provided with keys, and on a side of said packing washer facing said inlet valve, the edge of the openings of said packing washer are provided with a recessed step that joins a respective circle of a second diameter.

14. The unit as defined in claim 1, further comprising an eyebolt and a formed piece resting upon an upper end of said inner sleeve, wherein the upper region of said fixed housing includes an inner thread for accommodating the eyebolt to retain the formed piece.

15. The unit as defined in claim 14, wherein said formed piece comprises a synthetic component, said synthetic component and said inner sleeve each having an outer hexagonal profile, said fixed housing having an inner hexagonal profile adjoining the inner thread for accommodating the hexagonal profile of said synthetic component and said inner sleeve.

16. The unit as defined in claim 14, wherein said formed piece comprises a synthetic component having a longitudinal recess therein for guiding said spindle, said recess being defined by two inwardly tapering ends.

17. The unit as defined in claim 1, wherein said spindle has a lower end comprising an octagonal plate, and wherein said cage has a sheath shape, and has an upper end partially sealed off by a cover having a hexagonally shaped opening therethrough for accommodating the octagonal plate of said spindle.

18. The unit as defined in claim 17, further comprising a sliding cap having a cylindrical shape with a lower, open end, and an upper, partially closed end with an opening therethrough for the passage of said spindle, said sliding cap engaging with and overhanging the cover of said cage.

19. The unit as defined in claim 1, further comprising an O-ring and a synthetic slide ring each held by said inner sleeve, wherein said spindle comprises a ball laying in contact and between said O-ring and said synthetic slide ring within said inner sleeve.

20. The unit as defined in claim 1, further comprising a temperature limiter attached to a free end of said spindle.

21. The unit as defined in claim 20, wherein the free end of said spindle is polygonal shaped, and wherein said temperature limiter comprises at least one sleeve having in a longitudinal direction a inner cogged wheel rim corresponding to the polygonal shape of said spindle.

22. The unit as defined in claim 21, further comprising a synthetic component resting upon an upper end of said inner sleeve, wherein said at least one sleeve has diametrically opposed sides having sharp, bosses extending outwards therefrom, said bosses impacting against a side wall of the synthetic component at a finish of a rotational movement of said spindle.

23. The unit as defined in claim 21, wherein said at least one sleeve has a double-width cog engaging in a similar width groove in the spindle.

\* \* \* \* \*